May 19, 1936. L. CAMMEN 2,041,525
METHOD OF TESTING LUBRICANTS
Filed April 20, 1932
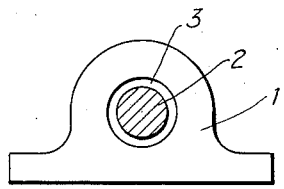
Fig.1
Fig.2
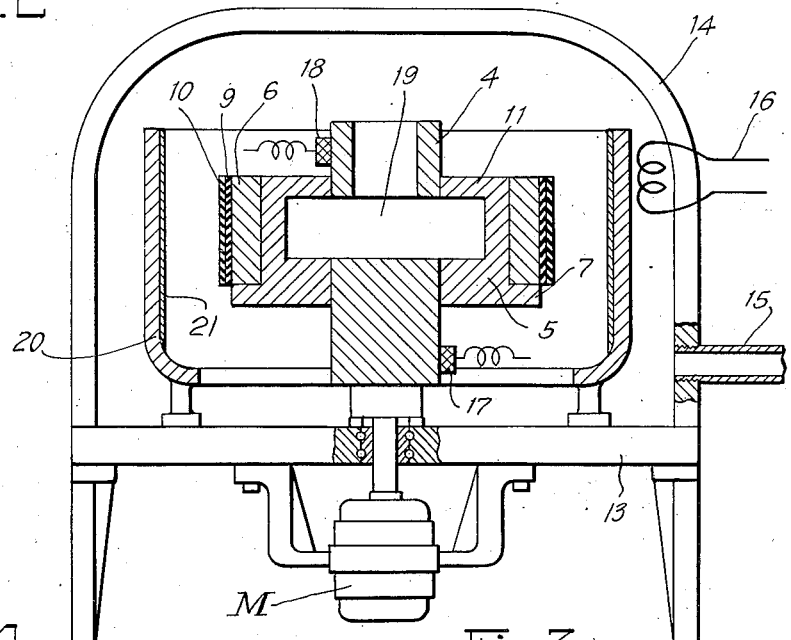
Fig.4
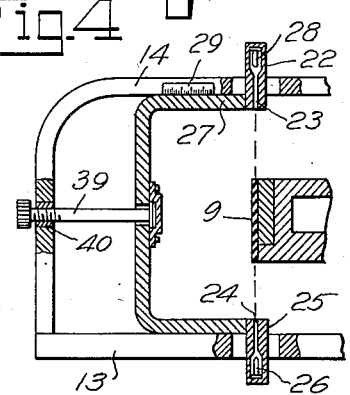
Fig.3
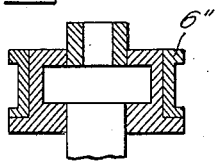
INVENTOR.
Leon Cammen
BY
ATTORNEY.

Patented May 19, 1936

2,041,525

UNITED STATES PATENT OFFICE 2,041,525

METHOD OF TESTING LUBRICANTS

Leon Cammen, New York, N. Y.

Application April 20, 1932, Serial No. 606,335

3 Claims. (Cl. 73—51)

The present invention refers to machines for testing phenomena of lubrication, such as lubricating properties of greases and oils, and lubricating abilities of materials of construction, such as shafts and bearings.

In the illustrations,—

Fig. 1 shows diagrammatically, in section, a bearing and a shaft therein.

Fig. 2 shows, in vertical section, the present invention.

Fig. 3 is a view similar to Fig. 2 showing another modified form of lubricant carrying member.

Fig. 4 is a view similar to a portion of Fig. 2 showing a means for measuring the thickness of an oil film.

In Fig. 1, 1 is a bearing, 2 a shaft capable of rotating therein, and 3 a film of oil or other lubricant, the thickness of which is exaggerated to facilitate illustration and description. Without going into the matter of theory of lubrication, it may be stated that we have here three main actions, viz.: first, the action between the lubricant and the metal of bearing 1, second, the action between the lubricant and the metal of shaft 2; and, third, the phenomena which take place in that part of the oil of film 3 within the bearing which is in contact with neither the metal of shaft 2 nor metal of bearing 1. The present machine is primarily intended to determine the first and second of the above enumerated actions, and to do so singly.

It is known that in order that lubrication should take place, it is necessary that the lubricant wet the surface to be lubricated, which means that there must be an adhesion between the lubricant and the surface to be lubricated. As the film of the lubricant in contact with the lubricated surface is subjected to various strains which tend to force the lubricant away from the lubricated surface, the extent of adhesion of the film of oil to the lubricated surface determines to a large degree, if not entirely, the issue of lubrication, and this (the degree of adhesion of the lubricant to the lubricated surface) is what the present machine is primarily intended to measure.

The machine consists essentially of shaft 4 held in bearings and driven by some motor M. This shaft carries a disc 5 rigidly attached to it or made in one piece with the shaft; the disc may carry a member 6 supported as by shoulder 7. While member 6 has been shown as a tubular member in Fig. 2, it may be of any shape, e. g. ring, channel, and the like (see Fig. 3). The lubricant to be tested may be applied to disc 5, as on its upper face 11, or to the member 6, whereupon the shaft 4 is set into rapid rotation.

The mass of lubricant (the case of the outer surface is here considered) on the tubular member 6, which may be taken as representative of what happens generally, consists essentially of two layers, film 9 in contact with the surface of the metal, supposed to be very thin and to be held to the surface of the metal, by adhesion, and layer 10, held to layer 9 by some force which we describe as viscosity or a function thereof. The thickness of these layers has been shown exaggerated to facilitate illustration and description. Also, the layers have been shown as distinct, separate layers for the purpose of illustration, but it will be understood that actually there is no such line of demarcation. With any desirable lubricant, the adhesion of film 9 to the metal is considerably greater than that between layer 9 and layer 10. When the shaft 4 is set in rotation, a centrifugal force develops in the lubricant tending to throw it off the surface of the metal. The layer 10 is thrown off fairly easily, but it takes a good deal more of centrifugal force, and hence a higher speed of rotation, to throw off the film 9. This permits measuring of the lubricating properties of the material by the centrifugal force necessary to throw off the film 9 or to reduce it to any desired thickness, since the centrifugal force is a function of the speed of rotation. The thickness of the film of oil at any stage of the test may be measured by the usual optical or electrical apparatus, one form of which is shown in Fig. 4, while the presence of any film may be determined by a wiper consisting of a piece of paper or a pack of thin sheets.

One well-known form of film thickness measuring device is disclosed somewhat diagrammatically in Fig. 4 and consists of a frame slidable transversely of the axis of shaft 4 in the foundation and bell 13 and 14 which serve as guides. The transitory movement of the frame may be accomplished by means of a screw 39 threaded through a fixed bearing 40 in said bell. The measuring device may comprise a beam of light which may be projected from a light source 26 through a narrow slit 24 in the end of frame 27 and designed to be received in a slit 23 at the opposite end of frame 27 so as to act upon a light sensitive cell 28. The line between slits 23 and 24 is parallel to the axis of shaft 4 or the surface of disc 6 so that as the frame is moved transversely the outer surface of said disc will intercept the beam of light between said slits. When, however, there is a film of oil 9 on the disc the frame 27 will have to be moved farther before the beam of light between the slits is intercepted. The position of frame 27 may be read upon a fixed scale 29. No claim is made to the specific construction of the thickness measuring means here described.

Two factors affect lubrication, the lubricant and the character of the surface to which it is applied. A lubricant may be good for one metal, but not for another one. It is to make possible to test lubricants in combination with various metallic surfaces that the removable member 6 has been provided, as this can be conveniently made of any metal with any surface finish desired.

The machine may be set up on a foundation, such as 13, and enclosed in a guard structure or bell such as 14, partly to protect the operator in case of explosion of member 6. It may be desired to test the lubricant at temperatures other than room temperature, or in special atmospheres, such as compressed air, vacuum, steam at various pressures, hydrogen, oxygen, etc. This can be attained by supplying the bell 14, as through connection 15, with the desired atmosphere, while the temperature inside of the bell may also be controlled by any suitable well known means, such as member 16 which may be an electrically heated coil of wire or a tube carrying a heated or refrigerated fluid. The disk itself may be maintained at the desired temperature by passing a current through it directly as by brushes 17 and 18. Finally, a hollow space 19 may be provided in the disc itself, either to lighten the structure or to receive a heating or cooling medium.

There is further provided a casing 20, with drain (not shown). This casing is primarily intended to collect the lubricant thrown off disc 5 and member 6, but is also used for another and important purpose. Lubricants do not necessarily consist of a single constituent but may be made up of several of them, e. g. saturated and unsaturated compounds. It may therefore happen that one of these compounds adheres more strongly to the surface of the metal than another compound. This is particularly so in the case of blended lubricants. This may be determined in the following manner.

Apply a layer of lubricant to the outer face of member 6, and give it a rotation at a speed sufficient to throw off the excess of the lubricant. This is received by casing 20 and drained off. Insert then into casing 20 a container 21 made of paper or like material, and speed up the rotation until some lubricant is thrown off. Replace the container in which this is collected by another one, and increase the speed of rotation until another batch of the lubricant is thrown off. This gives a mechanical fractionation of the lubricant showing the relative capacity of adhesion to the metal surface of the various constituents of the lubricant, and permitting the segregation and analysis of these various components.

I claim:

1. The method of investigating a lubricant which consists in determining the adhesive qualities thereof by applying said lubricant to the periphery of a rotatable member, rotating said member at high speeds until the lubricant is thrown off, and determining the speed at which the lubricant is thrown off.

2. The method of investigating a lubricant which consists in determining the adhesive qualities thereof by applying said lubricant to the periphery of a rotatable member, rotating said member at progressively increasing speeds and determining the centrifugal force necessary to throw the lubricant off the member.

3. The method of investigating a lubricant which consists in determining the adhesive qualities thereof by applying said lubricant to the periphery of a rotatable member before rotating the same, rotating said member at high speeds and measuring the thickness of the film of lubricant remaining on the periphery of said member.

LEON CAMMEN.